United States Patent [19]
Mori et al.

[11] Patent Number: 5,485,075
[45] Date of Patent: Jan. 16, 1996

[54] REACTIVE POWER COMPENSATING APPARATUS AND METHOD FOR REDUCING IN SWITCHING LOSS IN STEADY STATE OPERATION THEREOF

[75] Inventors: Takashi Mori, Tokyo; Fumitoshi Ichikawa, Kawaguchi, both of Japan

[73] Assignee: Kabushiki Kaisha Toshiba, Kawasaki, Japan

[21] Appl. No.: 269,025

[22] Filed: Jun. 30, 1994

[30] Foreign Application Priority Data

Jul. 1, 1993 [JP] Japan ..................... 5-189457

[51] Int. Cl.$^6$ ................. G05F 1/70; G05F 3/00
[52] U.S. Cl. ........................... 323/207; 323/205
[58] Field of Search ............ 323/205, 207–221, 323/235, 319; 318/798, 805, 807

[56] References Cited

U.S. PATENT DOCUMENTS

| | | | |
|---|---|---|---|
| 4,353,024 | 10/1982 | Gyugyi ..................... | 323/211 |
| 4,356,441 | 10/1982 | Putman et al. ............ | 323/210 |
| 4,529,925 | 7/1985 | Tanaka et al. ............ | 323/207 |
| 4,600,874 | 7/1986 | Tupper et al. ............ | 318/798 |
| 4,602,206 | 7/1986 | Walker ..................... | 323/211 |
| 5,051,683 | 9/1991 | Hirose et al. ............ | 323/207 |
| 5,053,691 | 10/1991 | Wild et al. ............... | 323/211 |
| 5,187,427 | 2/1993 | Erdman ..................... | 323/207 |
| 5,329,221 | 7/1994 | Schauder .................. | 323/207 |

FOREIGN PATENT DOCUMENTS 5-111162  4/1993  Japan.

*Primary Examiner*—Matthew V. Nguyen
*Attorney, Agent, or Firm*—Oblon, Spivak, McClelland, Maier & Neustadt

[57] ABSTRACT

A self-commutated static var compensator and a method is used for stabilizing a power system by controlling an output of a self-commutated converter for receiving/supplying power from/to the power system. A constant system voltage maintaining controller calculates a first target value signal of the reactive current in accordance with a difference between a reference voltage and a voltage detected by a voltage detector, and a reactive current controller generates a second target value signal of the reactive current in accordance with a difference between the first target value signal of the reactive current and a detected current. A converter controller applies a gate driving pulse to the self-commutated converter in response to the second target value signal of the reactive current and second target value signal of the active current. A loss reduction circuit stops the gate driving pulse corresponding to the second target value of the reactive current from being supplied to the gate of the self-commutated converter when reactive power output from the self-commutated converter is close to zero.

9 Claims, 3 Drawing Sheets

REACTIVE POWER COMPENSATING APPARATUS AND METHOD FOR REDUCING IN SWITCHING LOSS IN STEADY STATE OPERATION THEREOF

BACKGROUND OF THE INVENTION

1. Field of the Invention

The present invention relates to a reactive power compensating apparatus for stabilizing a system voltage of a power system and, more specifically, to a self-commutated reactive power compensating apparatus capable of reducing in switching loss in its steady state.

2. Description of the Related Art

A static var compensator is generally known as an apparatus for stabilizing a system voltage of a power system. In particular, a self-commutated static vat compensator (referred to as a self-commutated SVC hereinafter) is excellent in response characteristic and has the advantage of operating quickly according to variations in power system. The self-commutated SVC varies an output voltage of a self-commutated converter connected to the power system to regulate an amount of reactive power, and then a system voltage. The self-commutated converter generally includes a self-turnoff switching device and a DC (direct current) capacitor for establishing a back power.

FIG. 5 is a view showing a loss of a conventional self-commutated SVC. As shown in this figure, the loss is maximized (point B) at both the maximum points $Q_{Cmax}$ and $Q_{Lmax}$ of the reactive power output therefrom, but the loss occurs even when the reactive power is zero (point A). The loss occurring when the reactive power is zero is attributed to a switching operation of a self-commutated converter.

There are many cases where a voltage reactive power controller (VQC) for making a system power constant by opening/closing a power capacitor or a shunt reactor is installed in a substation. It was therefore expected that the reactive power output from the self-commutated SVC in the steady state operation would become substantially zero. Since, however, the conventional self-commutated SVC is always controlled so that the output voltage of the self-commutated converter coincides with the system voltage even in the steady state operation, even if the reactive power output from the self-commutated SVC is substantially zero, the switching operation of the self-commutated converter is repeated, resulting in a switching loss.

SUMMARY OF THE INVENTION

The present invention has been developed in consideration of the above situation, and its object is to provide a self-commutated SVC and a method which eliminates a loss due to a switching operation of a self-commutated converter when a reactive power output from the self-commutated SVC is substantially zero and thus operates with high efficiency.

According to the present invention, a switching loss reduction circuit and method is provided in a control system of a self-commutated SVC in order to stop a gate driving pulse from being sent to a self-commutated converter and reduce a switching loss in a case where a reactive power output from the self-commutated SVC is close to zero. In this case, therefore, a switching operation for regulating a reactive current is stopped, and a switching loss is suppressed accordingly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
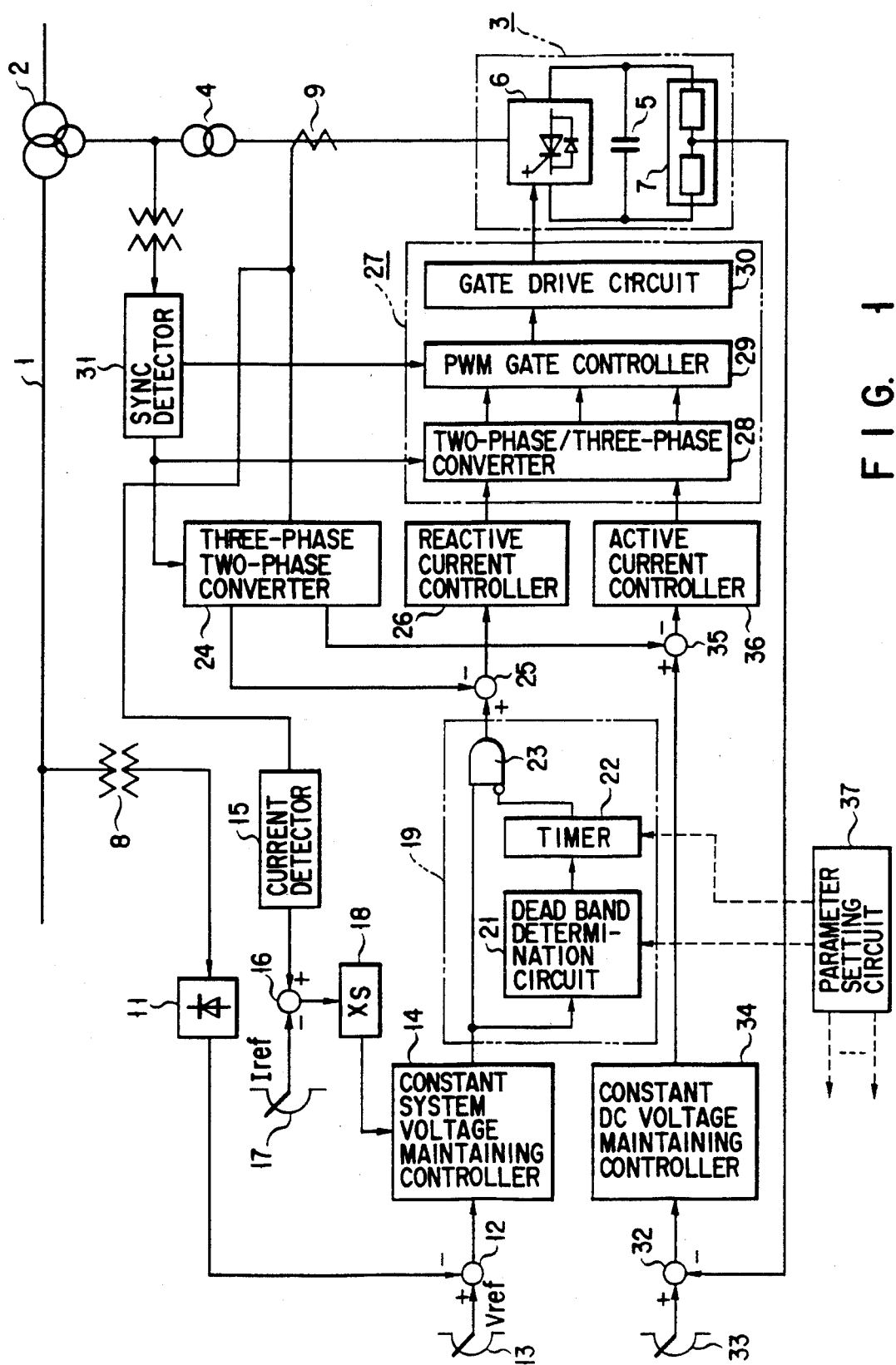
FIG. 1 is a block diagram showing a constitution of a self-commutated SVC according to an embodiment of the present invention.

A self-commutated SVC according to an embodiment of the present invention will now be described, with reference to the drawings. FIG. 1 is a block diagram showing the function of the self-commutated SVC of the present invention. In this figure, reference numeral 1 denotes a power system to be controlled. The power system 1 includes a main transformer 2, and a self-commutated converter 3 is connected to a tertiary winding of the main transformer 2 via a transformer 4. The main transformer 2 corresponds to a main transformer of a bank provided in a substation and the like, and phase modifying equipment as well as the self-commutated converter 3 is connected to the tertiary winding of the main transformer 2. The transformer 4 drops a voltage generated on the tertiary winding to the optimum one and applies it to the self-commutated converter 3.

The self-commutated converter 3 is constituted by a voltage type inverter, and includes a DC capacitor 5 for establishing a back power, a self-turnoff switching device 6 having an AC terminal connected to the transformer 4 and a DC terminal connected to the DC capacitor 5, and a DC voltage detector 7 for detecting a DC voltage of the DC capacitor 5.

The self-commutated SVC of the present invention receives a detection signal corresponding to the system voltage of the power system 1 from a PT (potential transformer) 8, and also receives a detection signal corresponding to the current flowing into or from the self-commutated converter 3 from a CT (current transformer) 9. A voltage detector 11 supplies a voltage detection signal representing the system voltage of the power system 1 to a subtracter in response to the detection signal input from the PT 8. The subtracter 12 compares the voltage detection signal with a reference voltage Vref generated from a reference voltage generator 13 and transmits a difference between them to a controller 14 for maintaining a constant system voltage. In contrast, a current detector 15 supplies a current detection signal representing a current flowing between the self-commutated converter 3 and transformer 4 to a subtracter 16 in response to the detection signal input from the CT 9. The subtracter 16 compares the current detection signal with a reference current Iref generated from a reference current generator 17 and transmits a difference between them to the controller 14 through a multiplier 18.

The controller 14 calculates a first target value of reactive current for stabilizing the power system 1 based on the outputs of the subtracter 12 and multiplier 18. A switching loss reduction circuit 19 is connected to an output terminal of the controller 14 from which the reference value of reactive current is output.

Figure 2:
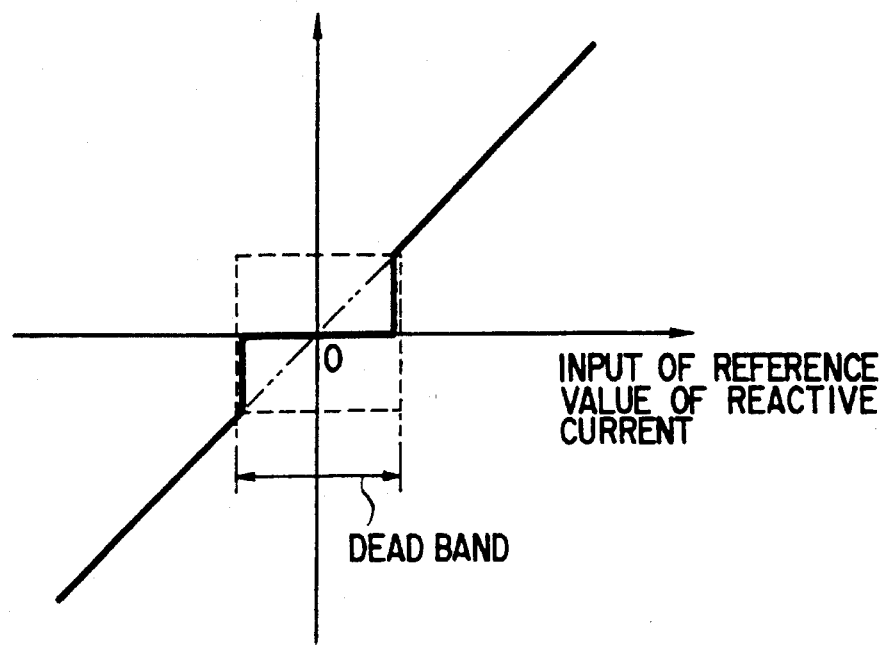
FIG. 2 is a view showing input/output characteristics of a dead band determination circuit.

The switching loss reduction circuit 19 includes a dead band determination circuit 21 in which a dead band shown in FIG. 2 is set, a timer circuit 22 controlled in response to both a start signal and a reset signal supplied from the dead band determination circuit 21, and an AND circuit 23 for carrying out an AND operation between an inverted signal output from the timer circuit 22 and a non-inverted signal output from the controller 14 and sending out the first target value of reactive current only when the conditions of the AND operation are met.

The detection signal of the CT 9 is supplied to a subtracter 25 through a three-phase/two-phase converter 24. The subtracter 25 subtracts a measured value (current) from the first target value of reactive current supplied from the switching loss reduction circuit 19 and outputs a subtraction value. An output terminal of the subtracter 25 is connected to a reactive current controller 26. In response to an output signal of the subtracter 25, the reactive current controller 26 calculates a reactive power component to be output from the self-commutated converter 3. This component is then supplied to a converter controller 27 for controlling the converter.

The converter controller 27 includes a two-phase/three-phase converter 28 for converting the output signal of the reactive current controller 26 into a three-phase signal in conformity with the power system 1, a PWM gate controller 29 for determining gate timing of the self-commutated converter 3 using an output of the two-phase/three-phase converter 28 as a second target value of the reactive power to be output from the self-commutated converter 3, and a gate drive circuit 30 for controlling a gate of the self-turnoff switching device 6 at the gate timing determined by the PWM gate controller 29.

The three-phase/two-phase converter 24, two-phase/three-phase converter 28, and PWM gate controller 29 are synchronized with the system 1.

An output terminal of the DC voltage detector 7 included in the self-commutated converter 3, is connected to a terminal of a subtracter 32, whereas a reference DC voltage generator 33 is connected to an input terminal of the subtracter 32. The subtracts 32 subtracts a voltage detected by the DC voltage detector 7 from a reference DC voltage generated from the reference DC voltage generator 33 and outputs a subtraction value from an output terminal thereof. A controller 34 for maintaining a constant DC voltage is connected to the output terminal of the subtracter 32. The controller 34 calculates a reference value of active current from the output of the subtracter 32. A subtracter 35 calculates a difference between the reference value of active current and measured value (current), and supplies the difference to an active current controller 36. The active current controller 36 calculates an active power component to be output from the self-commutated converter 3 in response to the output of the subtracter 35. The converter controller 27 is connected to an output terminal of the active current controller 36 to drive the self-commutated converter 3 using an output of the active current controller 36 as a second target value of active power.

The reference values of the generators 13, 17, and 33, the dead band of the dead band determination circuit 21, the time of the timer circuit 22 are set by arbitrary values supplied from a parameter setting circuit 37.

An operation of the apparatus having the above constitution will now be described.

First an operator sets a reference voltage Vref to the reference voltage generator 13, a reference current Iref to the reference current generator 17, and a coefficient (slope reactance Xs) to the multiplier 18, from the parameter setting circuit 37. The operator also sets a reference value of the DC voltage to be maintained by the DC capacitor 5, to the reference DC voltage generator 33.

Figure 4:
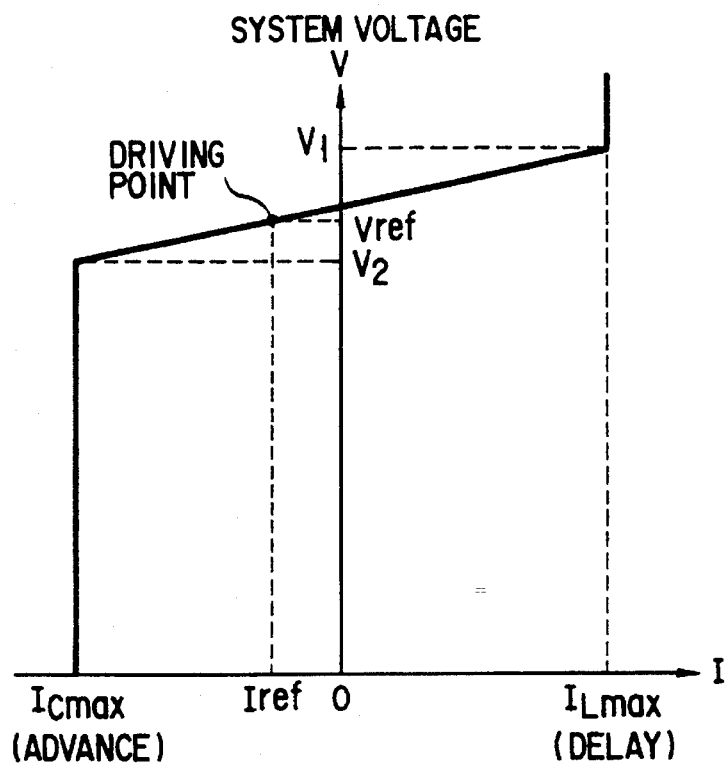
FIG. 4 is a view showing driving characteristics of the self-commutated SVC of FIG. 1.
Figure 5:
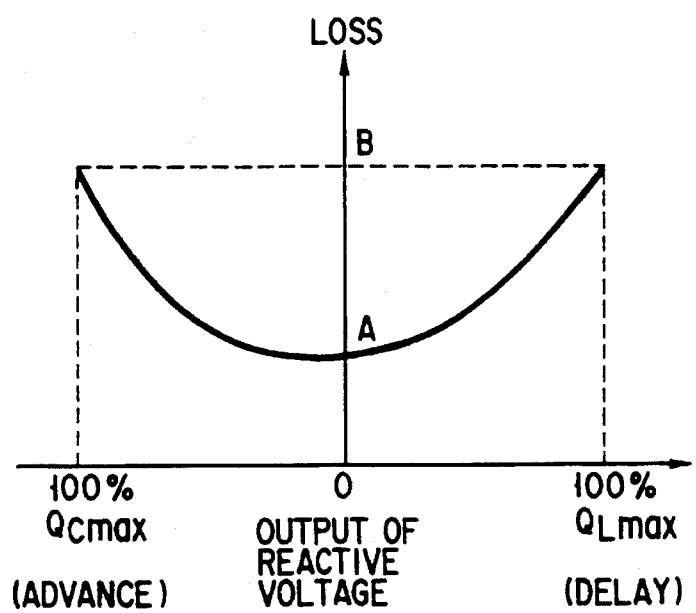
FIG. 5 is a view showing a switching loss of a conventional self-commutated SVC.

As shown in FIG. 4, the driving point of the system voltage depends upon Vref and Iref. The reference current Iref set to the reference current generator 17 can be shifted between the maximum value on the phase advance side and that on the phase delay side, as can be the driving point in accordance with the shift of Iref. The slope of a line along which the driving point moves, is determined by the slope reactance Xs set to the multiplier 18. The reference current Iref is variable and the driving point can freely be set in order to obtain a controllable range most suitable for controlling the system voltage and stabilizing the power system according to the purpose of operations.

In the embodiment of the present invention, as described above, the dead band shown in FIG. 2 is set to the dead band determination circuit 21 of the switching loss reduction circuit 19, and a reference period is set to the timer circuit 22. Here the dead band will be explained. As described above, it is expected that the reactive power output from the self-commutated SVC operated in the steady state will be substantially zero. In other words, when the reactive power output from the self-commutated SVC is in the vicinity of zero, the reference value of the reactive current output from the controller 14 is also in the vicinity of zero. In this embodiment, a region (width) covering the vicinity of zero of the reference value of the reactive current, is determined as the dead band. This region normally ranges from 0 to 10% between $Q_{Cmax}$ and $Q_{Lmax}$, depending upon the conditions of a controllable system.

The reference period is set to the timer circuit 22 in order to determine whether to maintain the steady state operation. For example, if the reference value of reactive current exists in the dead band for several seconds after the reference value goes into the dead band, it is determined that the steady state operation is maintained.

According to the self-commutated SVC of the present invention, the system voltage is subtracted from the reference voltage Vref by the subtracter 12, and the subtraction value is input to the controller 14. Furthermore, the reference current Iref is subtracted from the current of the self-commutated SVC by the subtracter 16, and the subtraction value is multiplied by the slope reactance Xs by the multiplier 18. This multiplication value is supplied to the controller 14. In order to conform the system voltage to the reference voltage Vref, the controller 14 calculates a reactive power to be output by the self-commutated converter 3, in the form of a reference value of reactive current, based on a difference between the reference voltage Vref and the current system voltage and on the currently-output signal of the self-commutated converter 3. The calculated reference value of reactive current is transmitted to the switching loss reduction circuit 19.

The dead band determination circuit 21 determines whether the reference value of reactive current falls within the dead band and, when the reference value goes into the dead band, transmits a start signal to the timer circuit 22. When the reference value of reactive current goes out of the dead band, the circuit 21 supplies a reset signal to the timer circuit 22. The timer circuit 22 starts to measure time upon receiving the start signal, and makes its output active after a lapse of the predetermined period of time. If the timer circuit 22 receives the reset signal before the lapse of the predetermined period of time, it resets measuring time and keeps its output inactive.

When the self-commutated SVC is not in the steady state operation, the reference value of reactive current calculated by the controller 14 is not included in the dead band set to the dead band determination circuit 21. Therefore, the conditions of AND condition of the AND circuit 23 are satisfied, with the result that the reference value of reactive current is supplied to the subtracter 25 via the AND circuit 23. In the subtracter 25, the measured value into which the output current of the converter 3 is converted by the three-phase/two-phase converter 24, is subtracted from the reference value of reactive current. This subtraction value is then supplied to the reactive current controller 26. The controller 26 generates a reactive power component, which is to be output from the self-commutated converter 3, from the subtraction value and transmits it to the converter controller 27. The reactive power component is then converted into a three-phase reactive power component by the two-phase/three-phase converter 28. The gate controller 29 obtains a voltage to be output from the converter 3 on the basis of the three-phase reactive power component and determines gate timing of the converter 3, thereby driving the self-commutated converter 3 through the gate drive circuit 30. The system voltage is thus controlled by the reactive power according to the output voltage of the self-commutated converter 3.

The operation of the self-commutated converter 3 is based upon the premise that the DC voltage (back voltage) stored in the DC capacitor 5 is kept at a constant value. If a phase of the output voltage of the converter 3 is delayed and active power flows from the power system 1 into the converter 3, its energy is accumulated in the DC capacitor 5, with the result that the DC voltage of the DC capacitor 5 increases. On the contrary, if active power flows from the converter 3 into the power system 1, the DC voltage of the DC capacitor 5 decreases; therefore, the DC capacitor 5 has to be replenished with active power which is to be consumed by the converter 3.

According to the embodiment of the present invention, the DC voltage of the DC capacitor 5 detected by the DC voltage detector 7 is input to the subtracter 32, and compared with the reference DC voltage set by the reference DC voltage generator 33. The controller 34 calculates a reference value of active current based on a result of the comparison. In the subtracter 35, the measured value into which the output current of the converter 3 is converted by the three-phase/two-phase converter 24, is subtracted from the reference value of active current. This subtraction (reference) value is then supplied to the active current controller 36. If the DC voltage of the DC capacitor 5 is lower than the subtraction value set as the reference DC voltage, the controller 36 calculates an active power component, which is to be output from the self-commutated converter 3, in order to charge the DC capacitor 5. The active power component is converted into a three-phase active power component by the two-phase/three-phase converter 28, and the three-phase active power component is supplied to the PWM gate controller 29. The PWM gate controller 29 determines gate timing of the converter 3 based on the three-phase active power component, thereby driving the converter 3 through the gate drive circuit 30. Consequently, a phase of the output voltage of the self-commutated converter 3 is delayed, and the active power flows from the power system 1 into the converter 3 and is accumulated in the DC capacitor 5.

When the self-commutated SVC is in the steady state operation, the reference value of reactive current calculated by the controller 14 is included in the dead band set by the dead band determination circuit 21. If this state continues for the reference period, the AND conditions of the AND circuit 23 are not satisfied. As a result, the subtracter 25 is not supplied with the reference value of reactive current from the controller 14. Since, in the steady state operation, the output voltage of the self-commutated converter 3 coincides with the system voltage, the current detected by the CT 9 is substantially equal to zero. Therefore, neither the reference value of reactive current is input to the reactive current controller 26 nor the target value of the reactive power component is input from the controller 26 to the converter controller 27. Consequently, a gate driving pulse of the target value is not supplied to the self-commutated converter 3. This state is called a gate block.

More specifically, when the reactive power component to be output from the self-commutated SVC is in the vicinity of zero and this state is unchangeable, it is determined that the reference value of reactive current goes into the dead band, and the self-commutated converter 3 is rendered in a stand-by state by blocking the gate thereof. Even in this stand-by state, the reference value of reactive current is always obtained and supplied to an input terminal of the AND circuit 23. If, in the stand-by state, the DC capacitor 5 is discharged, and the DC voltage decreases and deviates from the reference DC voltage, the gate pulse is automatically transmitted so as to keep the DC voltage constant.

Therefore, if a disturbance or the like occurs on a controllable power system and the reference value of reactive current deviates from the range of the dead band, the gate pulse starts to be transmitted immediately to control the power system.

Figure 3:
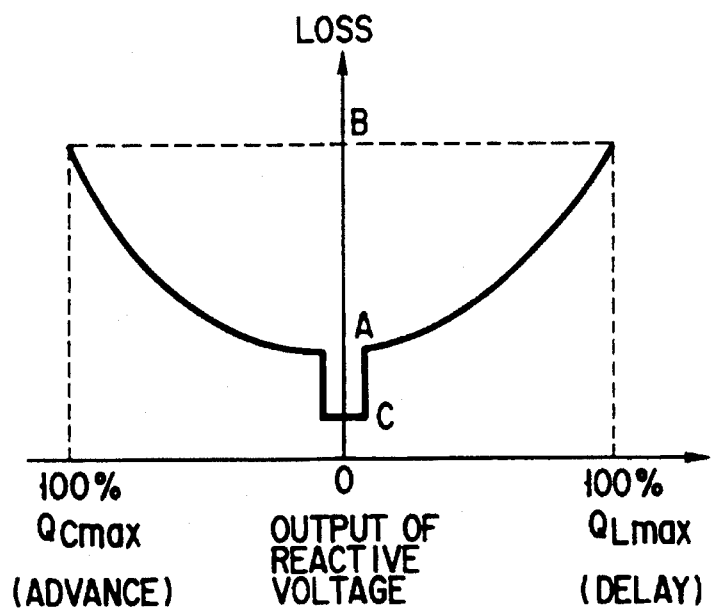
FIG. 3 is a view showing a switching loss of the self-commutated SVC of FIG. 1.

FIG. 3 shows a switching loss of the self-commutated SVC according to the embodiment of the present invention. When the gate of the self-commutated converter is not blocked, the switching loss is stopped at point A, even though the output voltage of the self-commutated SVC is zero. If, however, the gate is blocked, the switching loss can be reduced to point C.

In the foregoing embodiment of the present invention, the self-commutated SVC includes a single self-commutated converter. However, a plurality of self-commutated converters can be connected to the power system, and each have the same constitution as that of the above embodiment and can be operated in the same manner. If the plurality of self-commutated converters are employed, the transformer 4 for the converter functions as a multiple transformer since it supplies different phase angles to their respective converters. When the primary voltage of the transformer 4 coincides with the voltage of the power system to be controlled, the main transformer 2 is removed. Additional advantages and modifications will readily occur to those skilled in the art.

What is claimed is:

1. A self-commutated static vat compensator apparatus for stabilizing a power system, comprising:

a self-commutated converter connected to said power system, for receiving/supplying a power from/to said power system, said self-commutated converter including a DC capacitor, a DC voltage detector for detecting a DC voltage charged in the DC capacitor, and a self-turnoff switching device having a DC terminal connected to the DC capacitor, an AC terminal connected to said power system, and a control terminal to which a control pulse is applied;

voltage detection means for detecting a voltage of said power system;

current detection means for detecting a current flowing between said power system and said self-commutated converter;

system voltage control means for outputting a first target value signal of a reactive current in accordance with a difference between a voltage value of the voltage detected by said voltage detection means and a reference voltage value in order to conform the voltage of said power system to a present reference voltage corresponding to the reference voltage value;

reactive current control means connected to said system voltage control means, for outputting a second target value signal of the reactive current to be output from said self-commutated converter, in accordance with a difference between the first target value signal of the reactive current and a current value of the current detected by said current detection means;

loss reduction means for stopping the control pulse corresponding to the second target value of the reactive current supplied to the control terminal of the self-turnoff switching device when a reactive power output from said self-commutated converter is close to zero;

DC voltage control means for outputting a first target value signal of an active current in accordance with a difference between a DC voltage value of a reference DC voltage set for maintaining a DC voltage of said DC capacitor and a DC voltage value of the DC voltage detected by said DC voltage detector;

active current control means for outputting a second target value signal of the active current to be output from said self-commutated converter, in accordance with a difference between the first target value of the active current and the current value of the current detected by said current detection means; and converter control means for receiving the second target value signal of reactive current input from said reactive current control means and the second target value signal of active current input from said active current control means, and applying the control pulse to the control terminal of the self-turnoff switching device of the self-commutated converter in response to the second target value signal of the reactive current and the second target value of the active current respectively.

2. The apparatus according to claim 1, wherein said loss reduction means stops the first target value signal of the reactive current supplied to said reactive current control means in order to render said self-commutated converter in a stand-by condition when the reactive power of said self-commutated converter is close to zero.

3. The apparatus according to claim 1, wherein said loss reduction means determines, based on the first target value signal of the reactive current, whether said apparatus operates in a steady state, and stops the first target value signal of the reactive current input to said reactive current control means to render said self-commutated converter in a stand-by state when said apparatus operates in the steady state, and supplies the first target value signal of the reactive current to said reactive current control means when said apparatus operates in a non-steady state.

4. The apparatus according to claim 1, wherein said loss reduction means is arranged between said system voltage control means and said reactive current control means and determines whether said apparatus operates in a steady state based on the first target value signal of the reactive current supplied from said system voltage control means, said loss reduction means stopping the first target value signal of the reactive current input to said reactive current control means to render said self-commutated converter in a stand-by state when said apparatus operates in the steady state, and supplying the first target value signal of the reactive current to said reactive current control means when said apparatus operates in a non-steady state.

5. The apparatus according to claim 4, wherein said loss reduction means includes a dead band determination circuit, a timer circuit, and an AND circuit, said dead band determination circuit having a dead band which is set close to the first target value signal of the reactive current output from said system voltage control means when the reactive power of said apparatus is close to zero, outputting a start signal when the first target value signal of the reactive current goes into the dead band, and outputting a reset signal when the first target value signal of the reactive current goes out of the dead band;

said timer circuit receiving the start signal and the reset signal from said dead band determination circuit, starting to measure time upon reception of the start signal, and outputting a steady state operation detection signal when a reference period of time elapses, without receiving the reset signal; and said AND circuit receiving an inverted signal of the steady state operation detection signal and a non-inverted signal of the first target value signal of the reactive current, and supplying the first target value signal of the reactive current to said reactive current control means when an AND condition is satisfied.

6. The apparatus according to claim 5, further comprising parameter setting means for setting at least one of a width of the dead band set to said dead band determination circuit and a length of the reference period of time set to said timer circuit, to an arbitrary value.

7. The apparatus according to claim 1, further comprising means for generating a reference value of a current and a subtracter for calculating a difference between the reference value of the current and the current detected by said current detection means; and wherein said system voltage control means calculates the first target value signal of the reactive current based on a difference between the voltage value of the voltage detected by said voltage detection means and the reference value of the voltage and on an output of said subtracter.

8. The apparatus according to claim 1, wherein said converter control means includes a pulse width modulation controller for determining control timing of said self-commutated converter in response to the second target value signal of the reactive current and the second target value signal of the active current and control terminal drive means for applying the control pulse to the control terminal of said self-turnoff switching device based on the control timing determined by said pulse width modulation controller.

9. A method for stabilizing a power system by controlling an output of a self-commutated converter for receiving/supplying a power from/to said power system, said self-commutated converter comprising a DC capacitor and a self-turnoff switching device having a DC terminal connected to the DC capacitor, an AC terminal connected to said power system, and a control terminal to which a control pulse is applied, said method comprising:

- a step of calculating a first target value signal of a reactive current in accordance with a difference between a voltage of said power system and a reference voltage;
- a step of calculating a second target value signal of the reactive current to be output from said self-commutated converter, in accordance with a difference between the first target value signal of the reactive current and a current value of a current flowing into said self-commutated converter;
- a step of calculating a first target value of an active current in accordance with a difference between a DC voltage of said DC capacitor and a reference DC voltage;
- a step of calculating a second target value of the active current to be output from said self-commutated converter, in accordance with a difference between the first target value signal of the active current and a current value of the current flowing into the self-commutated converter;
- a step of applying a control pulse to the control terminal of the self-turnoff switching device of said self-commutated converter in response to the second target value signal of the reactive current and the second target value of the active current respectively; and
- a step of stopping the control pulse corresponding to the second target value of the reactive current from being supplied to the control terminal of the self-turnoff switching device of said self-commutated converter, when a reactive power output from said self-commutated converter is close to zero.

* * * * *